Jan. 5, 1971  J. KELLER  3,552,815
LINED BEARING
Filed Sept. 13, 1968
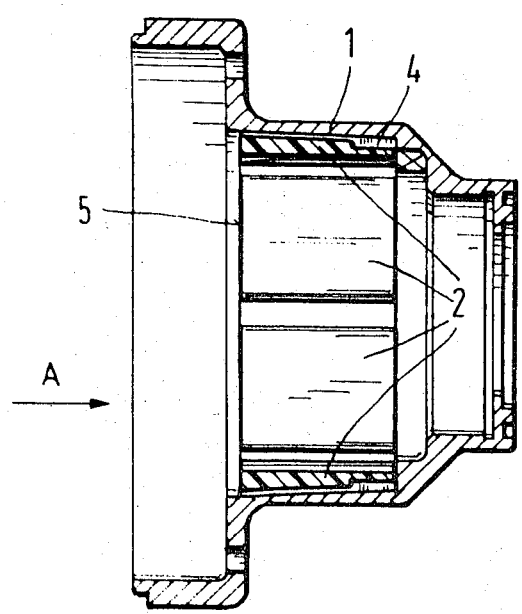
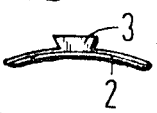
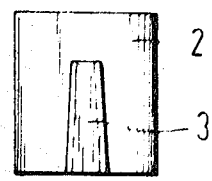
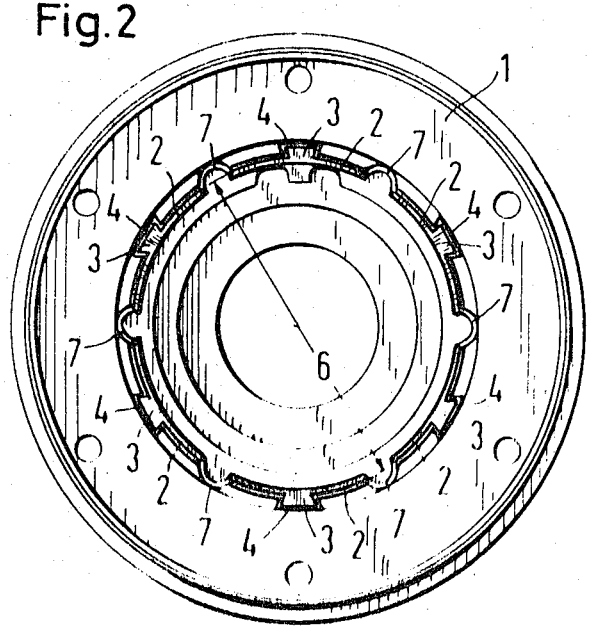
INVENTOR
Josef Keller
By: Kane and Brennan,
Attys.

3,552,815
LINED BEARING
Josef Keller, Schweinfurt, Germany, assignor to Fichtel
 & Sachs A.G., Schweinfurt, Germany
Filed Sept. 13, 1968, Ser. No. 759,697
Claims priority, application Germany, Sept. 15, 1967,
1,625,538
Int. Cl. F16c 33/04
U.S. Cl. 308—238                                  10 Claims

ABSTRACT OF THE DISCLOSURE

A metallic sleeve bearing is provided with an internal liner consisting of circumferentially spaced, thin, plastic plate segments each having an outer rib conformingly received in a dovetail groove of the sleeve surface, the groove being open in one axial direction and flaring toward the open end. The radius of curvature of each segment is sufficiently greater than that of the sleeve surface to cause the circumferentially terminal edge portions of the segments to be pressed against the sleeve surface by the resiliency of the segment, and the rib to be locked in the associated groove.

BACKGROUND OF THE INVENTION

This invention relates to sleeve bearings, and particularly to bearings in which one of the cooperating, metallic, annular bearing surfaces is provided with a thin plastic liner.

Because of the different thermal expansion coefficients of metals and plastics, it is necessary to split the plastic liner, and known liners are normally split obliquely to the axis. Such liners have been used successfully in relatively small bearings.

When a liner of the known type is used in a bearing having an effective diameter of one inch or more, difficulties arise because the liner tends to tighten about the inner bearing member in response to even slight bearing friction, the angle of wrap being almost 360°. The liner then acts as a band brake. The problem is not solved by increasing the stiffness of the liner, as by increasing its radial thickness, and bearings provided with plastic liners of the type described have been limited heretofore in practice to effective diameters of not significantly more than one inch.

The primary object of the invention is the provision of a plastic-lined bearing which is capable of being built successfully to any effective diameter.

SUMMARY OF THE INVENTION

With this and other objects in view, as will hereinafter become more fully apparent, the invention provides a bearing support defining an annular surface about the bearing axis with a liner arrangement essentially consisting of several liner members which have plate portions superimposed on the annular support surface in circumferentially spaced relationship. Each plate portion has a radial thickness which is much smaller than the axial or circumferential dimension thereof. A projection extends in locking engagement from each plate portion into an associated recess which extends radially inward from the afore-mentioned surface into the support.

Preferably, the recess is a groove of dovetail cross section, axially elongated, open at one axial end, and flaring toward the open end. The projection of the associated liner member is axially shorter than the groove in which it is received. When the radii of curvature of the support surface and of the opposite surface of the plate portion are suitably selected, the plate portion is held contiguous to the support surface at least at one or preferably both circumferentially terminal parts of the plate portion by the resiliency thereof.

As will be more fully described hereinafter, the afore-described configuration of the bearing permits the use of unitary plastic liner members whose plate portions are only about one millimeter thick. Because of the inherent, relatively poor thermal conductivity of plastics, a thin liner permits higher operating speeds to be maintained under otherwise similar conditions than a thicker liner.

Othe features and the attendant advantages of this invention will be readily apparent from consideration of the following specification relating to the annexed drawing.

BRIEF DESCRIPTION OF THE DRAWING

In the drawing:

FIG. 1 shows a bearing arrangement of the invention in axial section;

FIG. 2 illustrates the bearing of FIG. 1 in an axial end view taken in the direction of the arrow A;

FIG. 3 shows a liner segment of the bearing arrangement in a view corresponding to that of FIG. 1;

FIG. 4 shows the liner segment in a view corresponding to that of FIG. 2; and

FIG. 5 is a top plan view of the liner segment of FIG. 4.

DESCRIPTION OF THE PREFERRED EMBODIMENT

Referring to the drawing in more detail, there is seen a tubular bearing support 1 of stepped circular cross section. It has an internal cylindrical surface 6 largely covered by superimposed plate portions 2 of six plastic liner elements. The liner elements are of identical shape best seen in FIGS. 3 to 5. The plate portions 2 are segments of a thin hollow cylinder, rectangular, and only slightly longer in an axial direction than in a circumferential direction. The edges of the plate portion are beveled.

A rib 3 is integral with each plate portion 2 and projects along the median axial plane of symmetry of each liner member. The rib 3 starts at one circumferential edge 5 of the plate portion 2 and extends over about two-thirds of the axial length of the liner member. It is of dovetail shape over its entire length, but its cross section decreases in a direction away from the afore-mentioned circumferential edge 5.

The surface 6 of the support 1 has six equiangularly distributed axial grooves 4 which are dovetail shaped conformingly to receive the ribs 3. The left axial ends of the grooves 4, as viewed in FIG. 1, are open, and the cross section of each groove 4 is greatest at that end. The grooves 4 taper at the same angle as the ribs 3 and are longer than the ribs.

The plate portions 2 of the plastic liner segments are circumferentially spaced from each other, and the narrow axial strips of the support surface 6 exposed between the plate portions 2 have grooves 7 of approximately semi-circular cross section. The width of each groove 7 is approximately equal to the spacing of the two associated plate portions 2.

The illustrated bearing support 1 is the planet carrier for a dual speed transmission in a washing machine, not itself relevant to this invention. It cooperates with a shaft, not itself shown in the drawing, in the usual manner, the outer surface of the non-illustrated shaft frictionally engaging the exposed faces of the plate portions 2. In the illustrated example, the support 1 is an aluminum alloy diecasting, and the nonillustrated shaft is made of steel, the liner elements 2, 3 are unitary, injection-molded nylon pieces. The grooves 7 are normally filled with lubricant, and the beveled edges of the plate portions 2 assist in drawing lubricant to the interface of the plastic liner members and of the shaft. The radial thickness of the plate portion 2 is 0.8–1.0 mm.

When relaxed, the resilient plate portions 2 are cylindrically curved with a radius of 35 mm., whereas the surface 6 of the bearing support 1 has a radius of curvature of 29 mm. Other dimensions of the illustrated apparatus may be read from FIGS. 1 and 2 which are drawn substantially to scale.

Because of the different radii of curvature, the circumferential edges of the plate portions 2 are pressed against the surface 6 by the resiliency of the liner member itself, and the ribs 3 are locked in the grooves 4 in the assembled condition of the bearing by wedging engagement of the dovetailed elements.

The identical liner members 2, 3 are produced by injection molding at low cost and do not require further mechanical finishing when separated from their runners. Their ribs 3 are inserted into the open axial ends of the grooves 4 while radially outward pressure is applied to the plate portions 2 in their respective centers. When the edges 5 of the plate portions 2 are flush with the corresponding edge of the surface 6, the ribs 3 are fully seated in the grooves 4, and are locked in place when the radial pressure is relaxed.

It is normally preferred to mount an interposed plastic liner of the invention on the tubular outer bearing member, but analogous liner arrangements have been applied successfully to shafts for cooperation with inner cylindrical bearing surfaces.

The bearings of the invention are much simpler and less costly than ball bearings or needle bearings of similar capacity. They compare favorably at least with the latter as to frictional drag. The diameter of a bearing of the invention is smaller than that of either type of rolling bearing, and the space saved is even more important in many applications than the savings in materials of construction achieved by the invention. The number of segments in the liner arrangement may be selected to suit specific conditions, and segments of the same size and configurtaion may be employed in different numbers in bearings varying greatly in diameter. Even very large bearings may be equipped with liner members that are produced in very small, simple injection molds. The installation of the liners in the bearing supports does not require the use of tools, as described above.

Nylon is a preferred bearing material at this time, but the advantages of the invention apply equally to plastic liners made from other synthetic resin compositions. Depending on the operating conditions for which the bearing is designed, polytetrafluoroethylene, polyvinylchloride, polyisopropylene, and other thermoplastic synthetic resin compositions may be substituted for the nylon. The use of thermosetting materials is equally contemplated, and phenol- or melamine-formaldehyde resins have been used extensively in bearings, and are useful in this invention. Similarly, the nature of the metallic support material is not in itself relevant to this invention, and steel, brass, zinc or magnesium alloys, to mention just a few, may be substituted for the aluminum alloy diecasting specifically illustrated.

Other variations and modifications will readily suggest themselves to those skilled in the art.

What is claimed is:
1. In a bearing arrangement including a support defining an annular surface about an axis, and liner means superimposed on said surface, the improvement which comprises:
 (a) the liner means including a plurality of resilient, unitary liner members of plastic,
  (1) each liner member having a plate portion of a thickness extending radially relative to said axis, said thickness being substantially smaller than the circumferential and axial dimensions of said plate portion, said plate portions being superimposed on said surface in circumferentially spaced relationship, and
  (2) an elongated projection extending radially from said plate portion;
 (b) said support being formed with a plurality of axially elongated recesses extending inward of said support from said surface, said projections being conformingly received in said recesses respectively in locking engagement and increasing in circumferential width in a radial direction away from said plate portion.

2. In an arrangement as set forth in claim 1, each recess being of dovetail cross section, and the associated projection being conformingly received in said recess.

3. In an arrangement as set forth in claim 2, said recess having an end open in an axial direction to permit axial sliding entry of said associated projection.

4. In an arrangement as set forth in claim 3, the axial length of said recess being greater than the corresponding dimension of said associated projection.

5. In an arrangement as set forth in claim 3, said cross section increasing in an axial direction toward said open end.

6. In an arrangement as set forth in claim 1, said plate portion having an arcuately curved surface opposite said surface of said support, one of said surfaces being nearer said axis than the other surface and having a radius of curvature sufficiently greater than the radius of curvature of the other surface in the relaxed condition of said liner member to cause abutting engagement of said surfaces at a circumferentially terminal part of said plate portion remote from said projection under the resilient pressure of said liner member.

7. In an arrangement as set forth in claim 6, said surface of the support being concave and said surface of the plate portion being convex, and said projection being approximately equidistant from the two circumferentially terminal parts of said convex surface.

8. In an arrangement as set forth in claim 1, said support being formed with a plurality of axially elongated grooves in said surface, each groove extending between two of said liner members, the width of each groove substantially corresponding to the circumferential spacing of said two liner members.

9. In an arrangement as set forth in claim 1, said support being of metallic material.

10. In an arrangement as set forth in claim 9, said radial thickness being approximately one millimeter, and said annular surface having a diameter of more than one inch.

References Cited

UNITED STATES PATENTS

| | | | |
|---|---|---|---|
| 1,186,033 | 6/1916 | Perks | 308—237 |
| 2,009,204 | 7/1935 | Rryale | 308—238 |
| 2,398,786 | 4/1946 | Hanks | 308—237 |
| 2,739,195 | 3/1956 | Bales | 308—238 |
| 2,851,316 | 9/1956 | Thomson | 308—238 |
| 2,916,338 | 12/1959 | Muschalek | 308—237 |
| 2,957,733 | 10/1960 | Hare | 308—238 |
| 3,113,441 | 12/1963 | Weasler | 308—238X |
| 3,126,230 | 3/1964 | Spicer | 308—3.6 |

FOREIGN PATENTS

| | | | |
|---|---|---|---|
| 778,816 | 7/1957 | Great Britain. | |
| 493,304 | 3/1930 | Germany | 308—238 |

FRED C. MATTERN, Jr., Primary Examiner

W. S. RATLIFF, Jr., Assistant Examiner